United States Patent
Sasaoka et al.

(10) Patent No.: US 6,791,744 B2
(45) Date of Patent: Sep. 14, 2004

(54) RAMAN AMPLIFICATION OPTICAL FIBER, OPTICAL FIBER COIL, RAMAN AMPLIFIER, AND OPTICAL COMMUNICATION SYSTEM

(75) Inventors: Eisuke Sasaoka, Yokohama (JP); Motoki Kakui, Yokohama (JP); Masashi Onishi, Yokohama (JP); Toshiki Tanaka, Kawasaki (JP); Takao Naito, Kawasaki (JP)

(73) Assignees: Sumitomo Electric Industries, Ltd., Osaka (JP); Fujitu Limited, Kanagawa (JP)

(*) Notice: Subject to any disclaimer, the term of this patent is extended or adjusted under 35 U.S.C. 154(b) by 93 days.

(21) Appl. No.: 10/086,833

(22) Filed: Mar. 4, 2002

(65) Prior Publication Data

US 2002/0135866 A1 Sep. 26, 2002

(30) Foreign Application Priority Data

Mar. 22, 2001 (JP) .................................... P2001-083135

(51) Int. Cl.[7] ............................................... H01S 3/00
(52) U.S. Cl. ............................................. 359/334
(58) Field of Search ........................................ 359/334

(56) References Cited

U.S. PATENT DOCUMENTS

| | | | | |
|---|---|---|---|---|
| 6,301,419 B1 | * | 10/2001 | Tsukitani et al. | ........... 385/123 |
| 6,396,623 B1 | * | 5/2002 | Wysocki et al. | ......... 359/337.4 |
| 6,433,922 B1 | * | 8/2002 | Ghera et al. | ................ 359/334 |
| 6,477,306 B2 | * | 11/2002 | Kato et al. | ................... 385/123 |
| 6,483,633 B2 | * | 11/2002 | Onishi et al. | .......... 359/341.31 |
| 6,501,892 B1 | * | 12/2002 | Okuno et al. | ............... 385/127 |
| 2002/0001444 A1 | * | 1/2002 | Hirano et al. | ............... 385/123 |

FOREIGN PATENT DOCUMENTS

JP     11-84440     3/1999     ............. G02F/1/35

OTHER PUBLICATIONS

Okuno et al. Nonlinear–fiber–based discrete Raman amplifier with sufficiently suppressed degradation of WDM signal quality. Optical Amplifiers and Their Applications. 2001. pp. 72–74.*

* cited by examiner

Primary Examiner—Nelson Moskowitz
Assistant Examiner—Deandra M. Hughes
(74) Attorney, Agent, or Firm—McDermott, Will & Emery LLP

(57) ABSTRACT

The present invention relates to a Raman amplification optical fiber and the like comprising a structure which can Raman-amplify signal light including a plurality of wavelength components at a high efficiency and effectively restrain signal waveforms from deteriorating due to influences of nonlinear optical phenomena, while improving the degree of freedom in the design of optical fiber transmission lines and Raman amplifiers. As characteristics at each wavelength of signal light, the Raman amplification optical fiber has a chromatic dispersion with an absolute value of 6 ps/nm/km or more but 20 ps/nm/km or less, and an effective area $A_{eff}$ of 20 $\mu m^2$ or less, preferably less than 15 $\mu m^2$. More preferably, as a characteristic at each wavelength of signal light, the Raman amplification optical fiber has a Raman gain coefficient $G_R/A_{eff}$ of 0.005 $(W \cdot m)^{-1}$ or more.

17 Claims, 3 Drawing Sheets

RAMAN AMPLIFICATION OPTICAL FIBER, OPTICAL FIBER COIL, RAMAN AMPLIFIER, AND OPTICAL COMMUNICATION SYSTEM

BACKGROUND OF THE INVENTION

1. Field of the Invention

The present invention relates to a Raman amplification optical fiber which Raman-amplifies signal light including a plurality of wavelength components when Raman amplification pumping light is supplied thereto, a Raman amplifier including the Raman amplification optical fiber, an optical fiber coil in which the Raman amplification optical fiber is wound in a stacked fashion, and an optical communication system including the Raman amplifier.

2. Related Background Art

Raman amplifiers are those containing a Raman amplification optical fiber as an optical amplifier medium, thus being able to Raman-amplify signal light when Raman amplification pumping light is supplied to the Raman amplification optical fiber, and utilizes Raman shift which is a kind of nonlinear optical phenomenon in the Raman amplification optical fiber. From this viewpoint, it is desirable for the Raman amplification optical fiber to have a high nonlinearity. For example, the Raman amplifier disclosed in Japanese Patent Application Laid-Open No. HEI 11-84440 utilizes a highly nonlinear optical fiber or dispersion-compensating optical fiber as a Raman amplification optical fiber, so as to carry out lumped-constant optical amplification.

SUMMARY OF THE INVENTION

The inventors studied conventional Raman amplifiers and, as a result, have found the following problems. Namely, when a highly nonlinear optical fiber is utilized as a Raman amplification optical fiber, the Raman amplification efficiency becomes higher, whereby a large Raman amplification gain can be obtained, or a sufficient Raman amplification gain can be obtained at a relatively short fiber length. However, since the highly nonlinear optical fiber has a high nonlinearity at each signal wavelength (signal channel), the waveform of signal light may deteriorate under the influence of nonlinear optical phenomena such as four-wave mixing.

When a dispersion-compensating optical fiber is utilized as the Raman amplification optical fiber, on the other hand, it not only amplifies the signal light but also can compensate for the chromatic dispersion of the optical fiber transmission line. Also, since the chromatic dispersion of the dispersion-compensating optical fiber has a large absolute value at each signal wavelength, signal waveforms are effectively restrained from deteriorating due to the four-wave mixing in the dispersion-compensating optical fiber. However, since the chromatic dispersion of dispersion-compensating optical fiber has a large absolute value at each signal wavelength, it is necessary that the length of the dispersion-compensating optical fiber be controlled strictly according to the length of the optical fiber transmission line, whereby the degree of freedom in the design of optical fiber transmission lines or the design of Raman amplifiers is small.

In order to overcome the above-mentioned problems, it is an object of the present invention to provide a Raman amplification optical fiber comprising a structure which can Raman-amplify signal light at a high efficiency and effectively restrain signal waveforms from deteriorating due to influences of nonlinear optical phenomena, while improving the degree of freedom in the design of optical fiber transmission lines and Raman amplifiers. It is another object of the present invention to provide a Raman amplifier including the above-mentioned Raman amplification optical fiber, an optical fiber coil in which the Raman amplification optical fiber is wound in a stacked fashion, and an optical communication system including the Raman amplifier.

For overcoming the above-mentioned problems, the Raman amplification optical fiber according to the present invention is an optical device which Raman-amplifies signal light including a plurality of wavelength components when Raman amplification pumping light is supplied thereto, and constitutes a part of an optical fiber transmission line. As characteristics at each wavelength of signal light, the Raman amplification optical fiber has a chromatic dispersion with an absolute value of 6 ps/nm/km or more but 20 ps/nm/km or less, and an effective area $A_{\it{eff}}$ of 20 $\mu m^2$ or less, preferably less than 15 $\mu m^2$. More preferably, as a characteristic at each wavelength of signal light, the Raman amplification optical fiber has a Raman gain coefficient $G_R/A_{\it{eff}}$ of 0.005 $(W \cdot m)^{-1}$ or more.

By setting the effective area or Raman gain coefficient within its corresponding range mentioned above, the Raman amplification optical fiber enables the Raman amplification of signal light at a high efficiency. Also, by setting the absolute value of chromatic dispersion as a characteristic at each wavelength of signal light within the above-mentioned range, the Raman amplification optical fiber can effectively restrain signal waveforms from deteriorating due to influences of nonlinear optical phenomena, thereby improving the degree of freedom in the design of optical fiber transmission lines or Raman amplifiers.

The optical fiber coil according to the present invention includes the above-mentioned Raman amplification optical fiber (the Raman amplification optical fiber according to the present invention) wound in a stacked fashion. When such an optical fiber coil is employed, a lumped-constant Raman amplifier is realized.

The Raman amplifier according to the present invention is an optical device which Raman-amplifies signal light including a plurality of wavelength components introduced from an input end thereof and outputs thus amplified signal light from an output end thereof. The Raman amplifier comprises the above-mentioned Raman amplification optical fiber (the Raman amplifier according to the present invention) and a pumping light supplier. In the Raman amplifier, the Raman amplification optical fiber is disposed between the input and output ends, and constitutes a part of a transmission line between the input and output ends. The pumping light supplier is optically connected to at least one end of the Raman amplification optical fiber, and supplies Raman amplification pumping light to the Raman amplification optical fiber. Preferably, in the Raman amplifier, cumulative chromatic dispersion from the input end to the output end has an absolute value of 100 ps/nm or less at each wavelength of signal light.

Since the above-mentioned Raman amplification optical fiber is employed, the Raman amplifier can yield a high Raman amplification gain and effectively suppress the deterioration in signal waveforms. Also, as a consequence, the Raman amplifier has a high degree of freedom in design. In particular, for suppressing the deterioration in signal waveforms, it will be more favorable if the cumulative chromatic dispersion of the Raman amplification optical fiber has an absolute value of 100 ps/nm or less.

The optical communication system according to the present invention contains the above-mentioned Raman amplifier, and transmits signal light including a plurality of wavelength components, while the Raman amplifier Raman-amplifies the signal light. Preferably, one of the wavelengths included in the signal light in the optical communication system falls within one of C band (1530 nm to 1565 nm), L band (1565 nm to 1625 nm), and S band (1460 nm to 1530 nm). By employing the Raman amplifier, the optical communication system makes it possible to transmit signal light over a long distance, effectively suppresses the deterioration in signal waveforms, and yields a high degree of freedom in design.

BRIEF DESCRIPTION OF THE DRAWINGS

FIG. 1A is a view showing a cross-sectional structure of a Raman amplification optical fiber according to the present invention, whereas

FIG. 3A is a view showing the configuration of an optical fiber coil according to the present invention, whereas

DETAILED DESCRIPTION OF THE PREFERRED EMBODIMENTS

Examples of the Raman amplification optical fiber, optical fiber coil, Raman amplifier, and optical communication system according to the present invention will be explained in detail with reference to FIGS. 1A, 1B, 2, 3A, 3B, and 4. In the explanation of the drawings, constituents identical to each other will be referred to with numerals identical to each other without repeating their overlapping descriptions.

Raman Amplification Optical Fiber

Figure 1A:
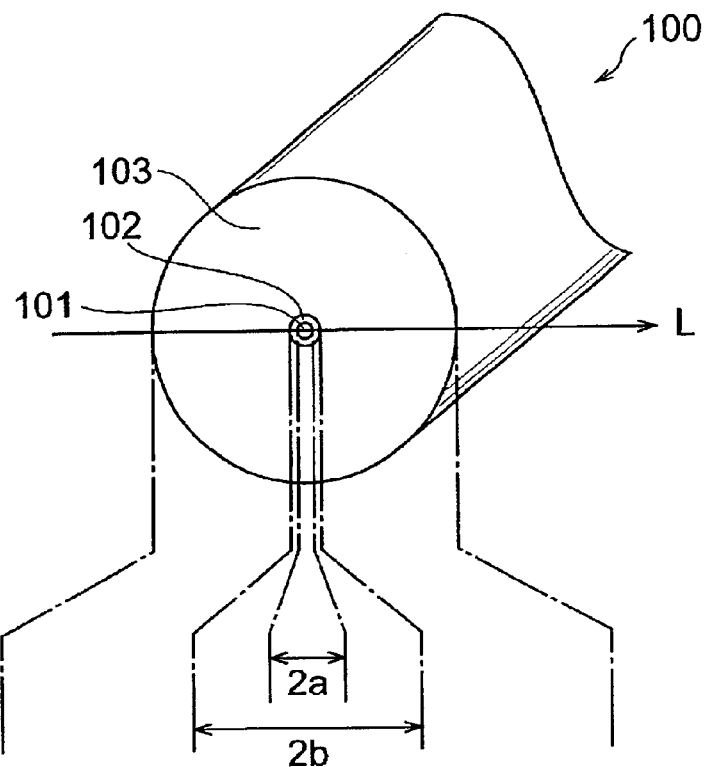

FIG. 1A shows a cross-sectional structure of a Raman amplification optical fiber according to the present invention. This Raman amplification optical fiber 100 is mainly composed of silica glass, and comprises a core region 101 having a predetermined refractive index n1 and an outer diameter 2a; a first cladding region 102, which is a glass region disposed at the outer periphery of the core region 101, having a refractive index n2 (<n1) and an outer diameter 2b; and a second cladding region 103, which is a glass region disposed at the outer periphery of the first cladding region 102, having a refractive index n3 (<n1, >n2). The core region 101 is doped with $GeO_2$ in order to attain a refractive index higher than that of pure silica, whereas the first cladding region 102 is doped with F element in order to attain a refractive index lower than that of pure silica.

Figure 1B:
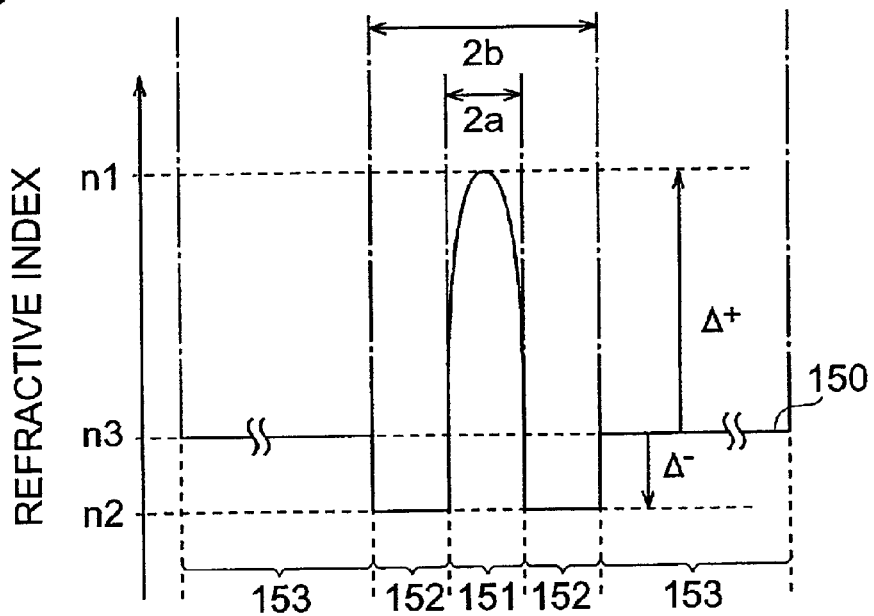
FIG. 1B is the refractive index profile of the Raman amplification optical fiber shown in FIG. 1A.

The refractive index profile 150 shown in FIG. 1B indicates the refractive index at each location on the line L in FIG. 1A, so that areas 151, 152, and 153 represent respective refractive indices on the line L of the core 101, first cladding region 102, and second cladding region 103.

In this specification, the relative refractive index difference $\Delta^+$ of the core region 101 and the relative refractive index difference $\Delta^-$ of the first cladding region 102 with reference to the second cladding region 103 are given by the following expressions:

$$\Delta^+ = ((n1)^2 - (n3)^2)/2(n3)^2$$

$$\Delta^- = ((n2)^2 - (n3)^2)/2(n3)^2$$

As indicated above, while the respective refractive index differences of the glass layers 101, 102 with respect to the second cladding region 103 acting as a reference region are expressed in terms of percentage, the order of refractive indices in each expression is fixed. Therefore, the refractive index of a glass layer whose relative refractive index difference takes a negative value means that it is lower than the refractive index of the second cladding region 103.

As characteristics at each wavelength of signal light, the Raman amplification optical fiber 100 has a chromatic dispersion with an absolute value of 6 ps/nm/km or more but 20 ps/nm/km or less, and an effective area $A_{eff}$ of 20 $\mu m^2$ or less, preferably less than 15 $\mu m^2$. Preferably, as a characteristic at each wavelength of signal light, the Raman amplification optical fiber 100 has a Raman gain coefficient $G_R/A_{eff}$ of 0.005 $(W \cdot m)^{-1}$ or more. Preferably, the wavelength component included in the signal light here falls within one of C band, L band, and S band.

The Raman amplification optical fiber 100 can Raman-amplify the signal light at a high efficiency since it has the effective area and Raman gain coefficient falling within their respective ranges mentioned above. Also, since the absolute value of chromatic dispersion at each wavelength of signal light falls within its range mentioned above, signal waveforms are effectively restrained from deteriorating due to influences of nonlinear optical phenomena, whereby the degree of freedom improves in the design of optical fiber transmission lines and Raman amplifiers.

Raman Amplifier

Figure 2:
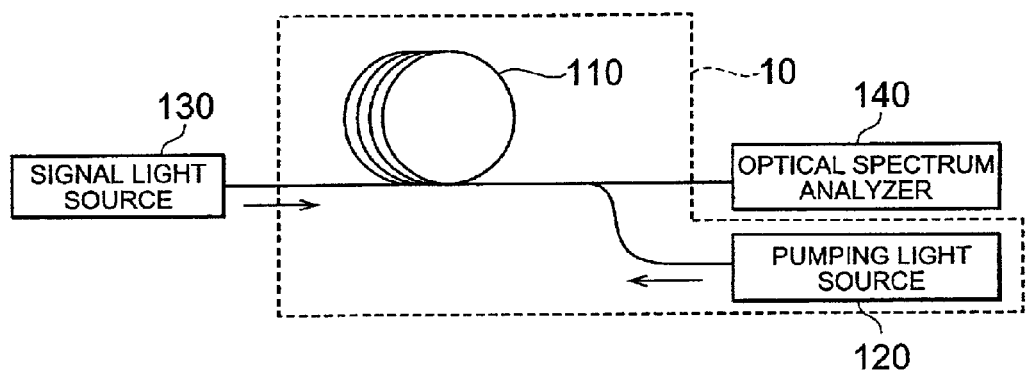
FIG. 2 is a diagram showing the configuration of a Raman amplifier according to the present invention.

FIG. 2 is a diagram showing the configuration of a Raman amplifier according to the present invention. This Raman amplifier 10 comprises an optical fiber coil 110 in which the Raman amplification optical fiber 100 is wound in a stacked fashion, and a pumping light source 120 for outputting Raman amplification pumping light to be supplied to the optical fiber coil 110. This diagram also illustrates a signal light source 130 for outputting the signal light to be fed into the Raman amplifier 10, and an optical spectrum analyzer 140 for measuring the spectrum of signal light outputted from the Raman amplifier 10.

In the Raman amplifier 10, the Raman amplification pumping light outputted from the pumping light source 120 is supplied to the optical fiber coil 110. The signal light outputted from the signal light source 130 propagates through the optical fiber coil 110, and is Raman-amplified during the propagation. The Raman-amplified signal light reaches the optical spectrum analyzer 140, and its spectrum is measured by the optical spectrum analyzer 140.

The Raman amplifier 10 is an optical device employing the Raman amplification optical fiber 100 having the structure mentioned above. Therefore, the Raman amplifier 10 yields a high gain in Raman amplification, effectively restrains the deterioration in signal waveforms, and has a high degree of freedom in design. In particular, for suppressing the deterioration in signal waveforms, it will be more favorable if the cumulative chromatic dispersion of the Raman amplification optical fiber has an absolute value of 100 ps/nm or less.

Optical Fiber Coil

Figure 3A:
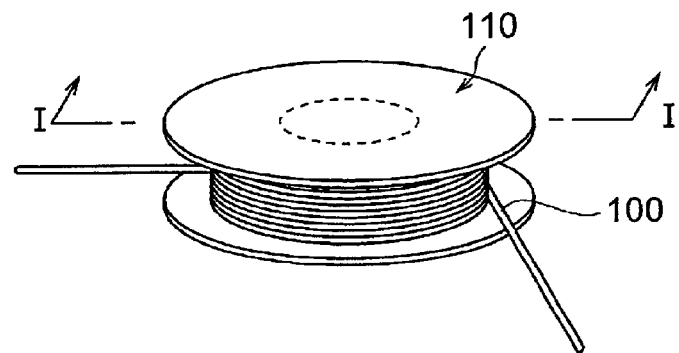
Figure 3B:
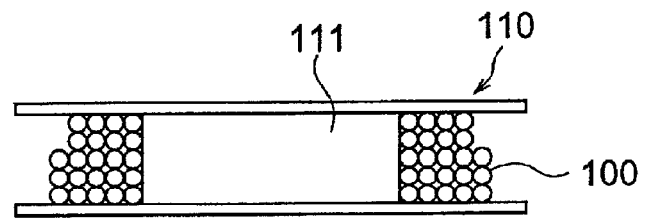
FIG. 3B is a view showing a cross-sectional form of the optical fiber coil taken along the line I—I shown in FIG. 3A.

FIG. 3A is a view showing the configuration of the optical fiber coil 110 according to the present invention, whereas FIG. 3B is a sectional view of the optical fiber coil 110 taken along the line I—I shown in FIG. 3A. As shown in FIGS. 3A and 3B, the optical fiber coil 110 is obtained when the Raman amplification optical fiber 100 is wound like layers about the barrel of a reel 111. When such an optical fiber coil is employed, a lumped-constant Raman amplifier is realized.

A specific example will now be explained. In the prepared Raman amplification optical fiber 100, the outer diameter 2a of the core region 101 is 3.5 μm, the outer diameter 2b of the first cladding region 102 is 8.8 μm, and the outer diameter 2c of the second cladding region 103 is 125 μm. With respect to the second cladding region 103, the relative refractive index difference $\Delta^+$ of the core region 101 and the relative refractive index difference $\Delta^-$ of the first cladding region 102 are 3.35% and −0.35%, respectively. With respect to light having a wavelength of 1550 nm in C band, the Raman amplification optical fiber 100 exhibits a transmission loss of 0.53 dB/km, an effective area $A_{eff}$ of 9.4 μm$^2$, a chromatic dispersion of −6 ps/nm/km, and a dispersion slope of +0.02 ps/nm$^2$/km.

When Raman amplification pumping light having a wavelength of 1450 nm is supplied to the optical fiber coil 110 including such a Raman amplification optical fiber 100, its Raman gain coefficient $G_R/A_{eff}$ is 0.0071 (W·m)$^{-1}$. The optical fiber coil 110 is constituted by 2.1 km of the Raman optical fiber 100 wound about the barrel of the reel 111 in a stacked fashion. The Raman amplification pumping light outputted from the pumping light source 120 has a wavelength of 1450 nm, whereas its power is 300 mW when fed into the optical fiber coil 110. The wavelength of signal light outputted from the signal light source 130 is 1550 nm. At that time, the Raman amplification gain of the Raman amplifier 10 is 10 dB at a wavelength of 1550 nm.

In this specific example, the chromatic dispersion of the whole Raman amplifier 10 (i.e., the cumulative chromatic dispersion in the Raman amplification optical fiber 100) is −12.6 ps/nm at a signal light wavelength of 1550 nm, thus yielding a small absolute value. Therefore, in an optical communication system including the Raman amplifier 10, the contribution of the Raman amplification optical fiber 100 to the increase in chromatic dispersion of the whole optical fiber transmission line is small, whereby the optical communication system has a high degree of freedom in the design of chromatic dispersion. Also, the chromatic dispersion of the Raman amplification optical fiber 100 is −6 ps/nm/km at a signal light wavelength of 1550 nm, thus yielding a large absolute value. Therefore, four-wave mixing is restrained from occurring in the Raman amplification optical fiber 100, whereby the deterioration in signal waveforms is effectively suppressed.

Optical Communication System

Figure 4:
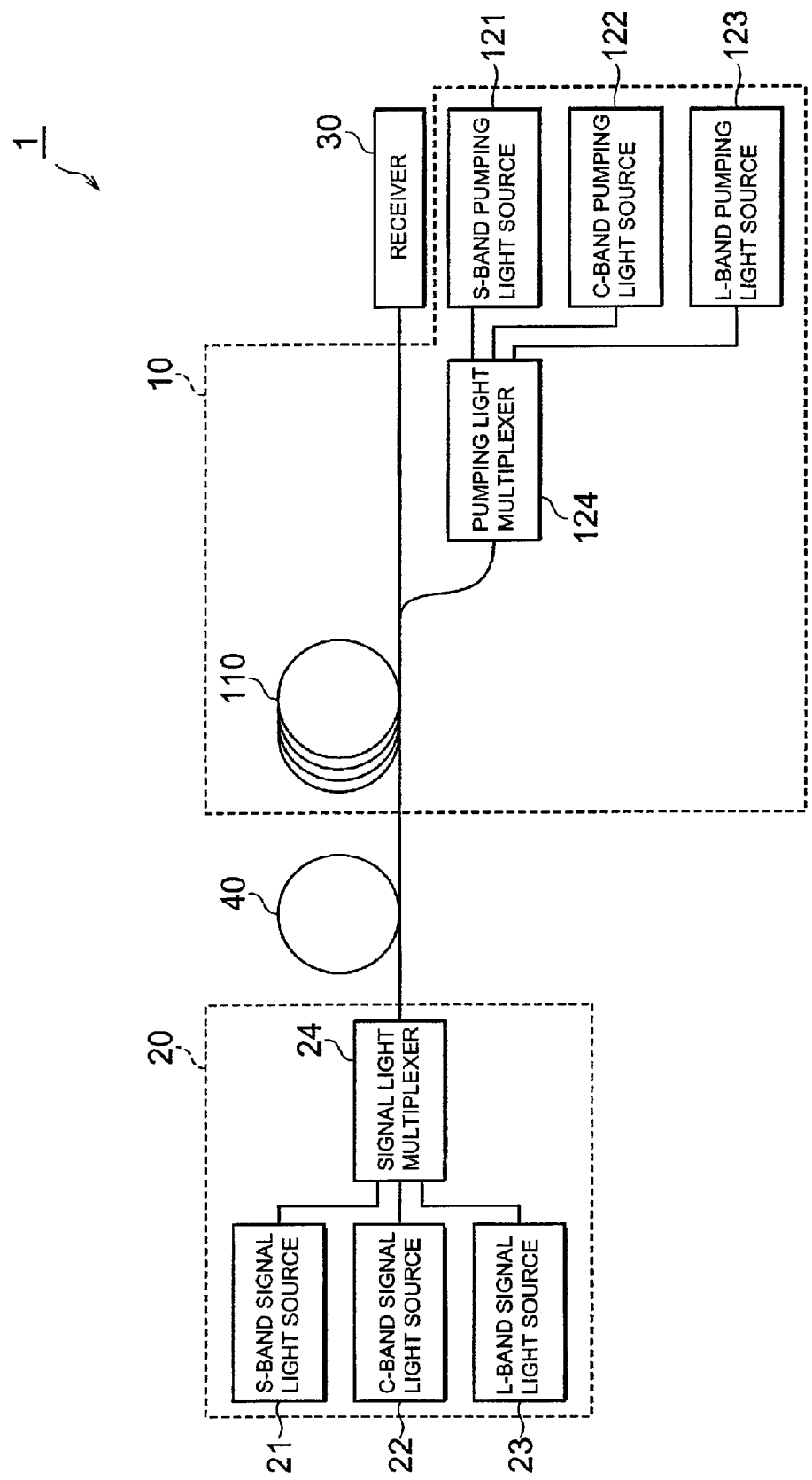
FIG. 4 is a diagram showing an optical communication system according to the present invention.

FIG. 4 is a diagram showing the configuration of an optical communication system 1 (including the above-mentioned optical fiber 100, optical fiber coil 110, and Raman amplifier 10). This optical communication system 1 comprises the Raman amplifier 10, a transmitter 20, and a receiver 30, whereas an optical fiber transmission line 40 is laid between the transmitter 20 and the Raman amplifier 10.

In the optical communication system 1, the transmitter 20 contains an S-band signal light source 21 for outputting signal light including a plurality of wavelength components within S band, a C-band signal light source 22 for outputting signal light including a plurality of wavelength components within C band, an L-band signal light source 23 for outputting signal light including a plurality of wavelength components within L band, and a signal light multiplexer 24. The signal light multiplexer 24 multiplexes the signal light outputted from the S-band signal light source 21, the signal light outputted from the C-band signal light source 22, and the signal light outputted from the L-band signal light source 23, and sends thus multiplexed signal light to the optical fiber transmission line 40.

The Raman amplifier 10 contains an S-band pumping light source 121, a C-band pumping light source 122, an L-band pumping light source 123, and a pumping light multiplexer 124. The S-band pumping light source 121 outputs Raman amplification pumping light having a wavelength which can Raman-amplify the signal light outputted from the S-band signal light source 21. The C-band pumping light source 122 outputs Raman amplification pumping light having a wavelength which can Raman-amplify the signal light outputted from the C-band signal light source 22. The L-band pumping light source 123 outputs Raman amplification pumping light having a wavelength which can Raman-amplify the signal light outputted from the L-band signal light source 23. The pumping light multiplexer 124 multiplexes the Raman amplification pumping light outputted from the S-band pumping light source 121, the Raman amplification pumping light outputted from the C-band pumping light source 122, and the Raman amplification pumping light outputted from the L-band pumping light source 123, and sends thus multiplexed Raman amplification pumping light to the optical fiber coil 110.

The optical fiber coil 110 is constituted by the Raman amplification optical fiber 100 wound in a stacked fashion (see FIGS. 3A and 3B). The Raman amplification optical fiber 100 comprises the structure shown in FIGS. 1A and 1B, while having, as characteristics at each wavelength of signal light, a chromatic dispersion with an absolute value of 6 ps/nm/km or more but 20 ps/nm/km or less, and an effective area $A_{eff}$ of 20 μm$^2$ or less, preferably less than 15 μM$_2$. Further, as a characteristic at each wavelength of signal light, the Raman amplification optical fiber 100 preferably has a Raman gain coefficient $G_R/A_{eff}$ of 0.005 (W·m)$^{-1}$ or more.

In this optical communication system 1, the Raman amplification pumping light outputted from the S-band pumping light source 121, the Raman amplification pumping light outputted from the C-band pumping light source 122, and the Raman amplification pumping light outputted from the L-band pumping light source 123 are multiplexed by the pumping light multiplexer 124, and thus multiplexed Raman amplification pumping light is supplied to the optical fiber coil 110. The signal light outputted from the S-band signal light source 21, the signal light outputted from the C-band signal light source 22, and the signal light outputted from the L-band signal light source 23 are multiplexed by the signal light multiplexer 24, and thus multiplexed signal light is sent to the optical fiber transmission line 40. The signal light sent out from the signal multiplexer 24 propagates through the optical fiber transmission line 40, thereby reaching the Raman amplifier 10. Further, the signal light having reached the Raman amplifier 10 is Raman-amplified while propagating through the optical fiber coil 110 within the Raman amplifier 10. The Raman-amplified signal light reaches the receiver 30 and is received thereby. Thus, the optical communication system 1 can perform wavelength division multiplexing (WDM) transmission by using each of the signal light in S band, signal light in C band, and signal light in L band, thereby enabling large-capacity, long-distance information transmission.

Since the Raman amplification optical fiber 100 having the structure shown in FIGS. 1A and 1B is employed, the Raman amplifier 10 exhibits a high gain in Raman amplification, thereby effectively suppressing the deterioration in signal waveforms. Also, since the Raman amplification optical fiber 100 is employed, the Raman amplifier 10 has a high degree of freedom in design. In particular, for suppressing the deterioration in signal waveforms, it will be more favorable if the cumulative chromatic dispersion of the Raman amplification optical fiber 100 has an absolute value of 100 ps/nm or less. Since such a Raman amplifier 10 is employed, the optical communication system 1 enables long-distance transmission of signal light, effectively suppresses the deterioration in signal waveforms, and has a high degree of freedom in design.

A specific example will now be explained. The Raman amplification optical fiber 100 has a structure similar to that shown in FIGS. 1A and 1B, and comprises a core region 101 having an outside diameter 2a of 3.9 $\mu$m, a first cladding region 102 having an outside diameter 2b of 9.8 $\mu$m, and a second cladding region 103 having an outside diameter of 125 $\mu$m. With respect to the second cladding region 103, the relative refractive index difference $\Delta^+$ of the core region 101 is 3.35%, and the relative refractive index difference $\Delta^-$ of the first cladding region 102 is −0.35%. With respect to light having a wavelength of 1480 nm within S band, the Raman amplification optical fiber 100 exhibits a transmission loss of 0.65 dB/km, an effective area $A_{eff}$ of 8.4 $\mu$m$^2$, achromatic dispersion of −19.0 ps/nm/km, and a dispersion slope of +0.004 ps/nm$^2$/km. With respect to light having a wavelength of 1550 nm within C band, the Raman amplification optical fiber 100 exhibits a transmission loss of 0.55 dB/km, an effective area $A_{eff}$ of 9.0 $\mu$m$^2$, a chromatic dispersion of −18.7 ps/nm/km, and a dispersion slope of +0.004 ps/nm$^2$/km. With respect to light having a wavelength of 1610 nm within L band, the Raman amplification optical fiber 100 exhibits a transmission loss of 0.52 dB/km, an effective area $A_{eff}$ of 9.5 $\mu$m$^2$, a chromatic dispersion of −18.5 ps/nm/km, and a dispersion slope of +0.004 ps/nm$^2$/km.

The chromatic dispersion of the whole Raman amplifier 10, i.e., the cumulative chromatic dispersion in the Raman amplification optical fiber 100, has a small absolute value at a signal light wavelength of 1550 nm in this specific example as well. Therefore, in an optical communication system including the Raman amplifier 10, the contribution of the Raman amplification optical fiber 100 to the increase in chromatic dispersion of the optical fiber transmission line 40 is small, thereby yielding a high degree of freedom in the design of chromatic dispersion. Also, the chromatic dispersion of the Raman amplification optical fiber 100 has a large absolute value at a signal light wavelength of 1550 nm. As a consequence, four-wave mixing is restrained from occurring in the Raman amplification optical fiber 100, whereby the deterioration in signal waveforms is effectively suppressed.

Though FIG. 4 shows the S-band signal light source 21, the C-band signal light source 22, and the L-band signal light source 23 one by one, each signal light source may be constituted by a plurality of light sources having output wavelengths different from each other. Also, though the S-band pumping light source 121, the C-band pumping light source 122, and the L-band pumping light source 123 are shown one by one, each pumping light source may be constituted by a plurality of light sources having output wavelengths different from each other. A plurality of transmission units each having the structure similar to that of the optical fiber transmission line 40 and Raman amplifier 10 may be provided between the transmitter 20 and the receiver 30.

According to the present invention, as explained in the foregoing, the absolute value of chromatic dispersion and the effective area $A_{eff}$, preferably with the Raman gain coefficient $G_R/A_{eff}$, are set within appropriate numeric ranges, which enables the Raman amplification of signal light at a high efficiency, whereby the signal waveforms are effectively restrained from deteriorating due to influences of nonlinear optical phenomena. Also, this improves the degree of freedom in the design of optical fiber transmission lines and Raman amplifiers.

On the other hand, the optical fiber coil is employed while in a state where the above-mentioned Raman amplification optical fiber is wound in a stacked fashion, whereby a lumped-constant Raman amplifier can be realized.

Further, since the above-mentioned Raman amplification optical fiber is employed, the Raman amplifier attains a high Raman amplification gain. This effectively suppresses the deterioration in signal waveforms, and improves the degree of freedom in design. In particular, for suppressing the deterioration in signal waveforms, it will be more favorable if the cumulative chromatic dispersion in the Raman amplification optical fiber has an absolute value of 100 ps/nm or less. Since the above-mentioned Raman amplifier is employed, the optical communication system enables large-capacity, long-distant information transmission. Also, the optical communication system has a high degree of freedom in design, while effectively suppressing the deterioration in signal waveforms.

What is claimed is:

1. A Raman amplification optical fiber for Raman-amplifying signal light including a plurality of wavelength components when Raman amplification pumping light is supplied thereto, said Raman amplification optical fiber, as characteristics at each wavelength of said signal light, having:
   a chromatic dispersion with an absolute value of 6 ps/nm/km or more but 20 ps/nm/km or less;
   an effective area $A_{eff}$ of 20 $\mu$m$^2$ or less; and
   a Raman gain coefficient $G_R/A_{eff}$ of 0.005 (W·m)$^{-1}$ or more.

2. An optical fiber coil including the Raman amplification optical fiber according to claim 1 wound in a stacked fashion.

3. A Raman amplifier for Raman-amplifying signal light including a plurality of wavelength components introduced from an input end thereof and outputting thus amplified signal light from an output end thereof, said Raman amplifier comprising:
   the Raman amplification optical fiber according to claim 1, said Raman amplification optical fiber being disposed between said input end and said output end and constituting at least a part of a transmission line between said input end and said output end; and
   a pumping light supplier optically connected to at least one end of said Raman amplification optical fiber, said pumping light supplier supplying said Raman amplification pumping light to said Raman amplification optical fiber.

4. A Raman amplifier according to claim 3, wherein cumulative chromatic dispersion from said input end to said output end has an absolute value of 100 ps/nm or less at each wavelength of said signal light.

5. An optical communication system comprising:
   a transmission line through which signal light including a plurality of wavelength components propagates; and
   the Raman amplifier according to claim 3.

6. An optical communication system according to claim 5, wherein at least one wavelength included in said signal light exists within C band of 1530 nm to 1565 nm.

7. An optical communication system according to claim 5, wherein at least one wavelength included in said signal light exists within L band of 1565 nm to 1625 nm.

8. An optical communication system according to claim 5, wherein at least one wavelength included in said signal light exists within S band of 1460 nm to 1530 nm.

9. A Raman amplification optical fiber for propagating signal light including a plurality of wavelength components, and Raman-amplifying said signal light when Raman amplification pumping light is supplied thereto; said Raman amplification optical fiber, as characteristics at each wavelength of said signal light, having:

a chromatic dispersion with an absolute value of 6 ps/nm/km or more but 20 ps/nm/km or less; and an effective area $A_{eff}$ of less than 15 $\mu m^2$.

10. A Raman amplification optical fiber according to claim 9, further having a Raman gain coefficient $G_R/A_{eff}$ of 0.005 $(W \cdot m)^{-1}$ or more at each wavelength of said signal light.

11. An optical fiber coil including the Raman amplification optical fiber according to claim 9 wound in a stacked fashion.

12. A Raman amplifier for Raman-amplifying signal light including a plurality of wavelength components introduced from an input end thereof and outputting thus amplified signal light from an output end thereof, said Raman amplifier comprising:

the Raman amplification optical fiber according to claim 9, said Raman amplification optical fiber being disposed between said input end and said output end and constituting at least a part of a transmission line between said input end and said output end; and a pumping light supplier optically connected to at least one end of said Raman amplification optical fiber, said pumping light supplier supplying said Raman amplification pumping light to said Raman amplification optical fiber.

13. A Raman amplifier according to claim 12, wherein cumulative chromatic dispersion from said input end to said output end has an absolute value of 100 ps/nm or less at each wavelength of said signal light.

14. An optical communication system comprising:

a transmission line through which signal light including a plurality of wavelength components propagates; and the Raman amplifier according to claim 12.

15. An optical communication system according to claim 14, wherein at least one wavelength included in said signal light exists within C band of 1530 nm to 1565 nm.

16. An optical communication system according to claim 14, wherein at least one wavelength included in said signal light exists within L band of 1565 nm to 1625 nm.

17. An optical communication system according to claim 14, wherein at least one wavelength included in said signal light exists within S band of 1460 nm to 1530 nm.

* * * * *